(12) United States Patent
Espinasse

(10) Patent No.: US 9,707,934 B2
(45) Date of Patent: Jul. 18, 2017

(54) END FITTING FOR A WIPER

(75) Inventor: Philippe Espinasse, Coudes (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 244 days.

(21) Appl. No.: 14/008,934

(22) PCT Filed: Mar. 26, 2012

(86) PCT No.: PCT/EP2012/055328
§ 371 (c)(1),
(2), (4) Date: Oct. 23, 2013

(87) PCT Pub. No.: WO2012/130802
PCT Pub. Date: Oct. 4, 2012

(65) Prior Publication Data
US 2014/0047663 A1  Feb. 20, 2014

(30) Foreign Application Priority Data

Mar. 31, 2011 (FR) ..................... 11 52712

(51) Int. Cl.
*B60S 1/38* (2006.01)
*B60S 1/52* (2006.01)

(52) U.S. Cl.
CPC ........... *B60S 1/3889* (2013.01); *B60S 1/3891* (2013.01); *B60S 1/524* (2013.01); *B60S 1/381* (2013.01)

(58) Field of Classification Search
CPC ..... B60S 1/3889; B60S 1/3891; B60S 1/3893
USPC .......................... 15/250.32, 250.361, 250.452
See application file for complete search history.

(56) References Cited

U.S. PATENT DOCUMENTS

| 2,310,751 | A | * | 2/1943 | Scinta | ........................ 15/250.32 |
| 3,390,416 | A | * | 7/1968 | Scinta | ........................ 15/250.32 |
| 3,757,379 | A | * | 9/1973 | Benson | .................... B60S 1/524 |
| | | | | | 15/250.04 |
| 3,885,265 | A | * | 5/1975 | Deibel et al. | ............. 15/250.452 |
| 4,543,682 | A | * | 10/1985 | Kessler et al. | ........... 15/250.452 |
| 2006/0107485 | A1 | * | 5/2006 | Kim | ........................ 15/250.201 |

(Continued)

FOREIGN PATENT DOCUMENTS

| CN | 1960902 A | 5/2007 | | |
| DE | 10000373 A1 | * 8/2001 | ................ B60S 1/38 |

(Continued)

OTHER PUBLICATIONS

DE10000373A1 (machine translation), 2001.*

(Continued)

*Primary Examiner* — Andrew A Horton
(74) *Attorney, Agent, or Firm* — Osha Liang LLP

(57) ABSTRACT

The invention relates to an end piece (11) of a windshield wiper comprising at least one spring strip (5) and a wiper blade (1). The end piece (11) has a first part (12) and a second part (13). The first part (12) includes a recess for accommodating the spring strip (5), a cavity for accommodating the wiper blade (1), and a hole (28) that is in communication with the recess and the cavity. The second part (13) includes a locking means for blocking the end piece (11) relative to the wiper, said locking means extending inside the hole (28). The first pan (12) and the second part (13) are connected to each other by a removable attachment means (14). The end piece is for use in motor vehicles.

18 Claims, 7 Drawing Sheets

(56) References Cited

U.S. PATENT DOCUMENTS

Figure 5:
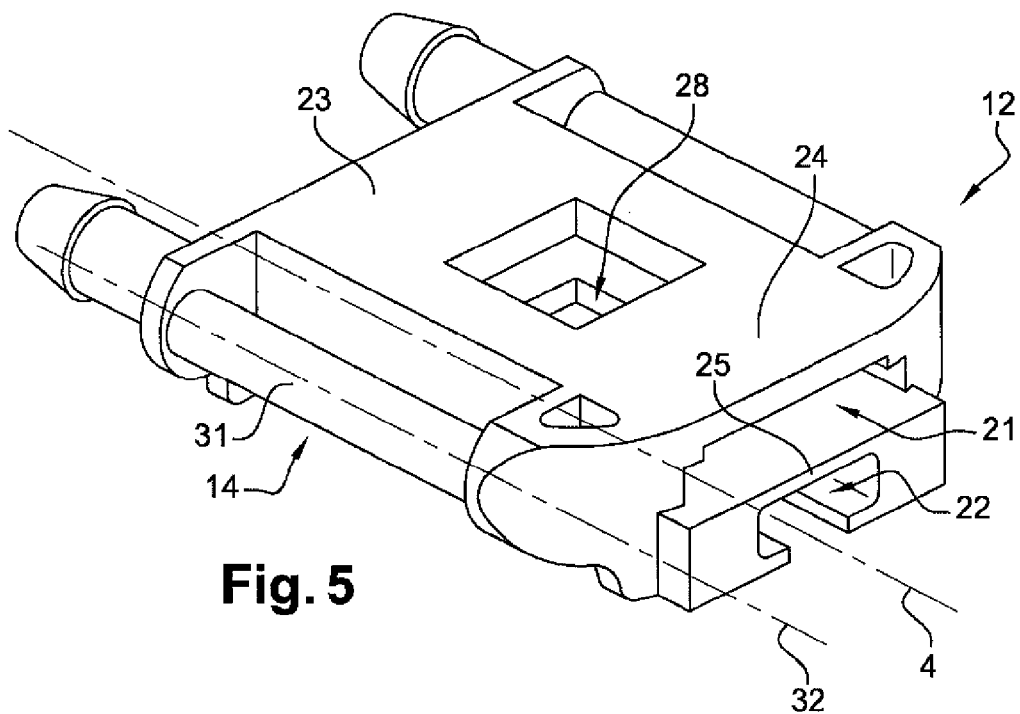

| | | |
|---|---|---|
| 2006/0112511 A1 | 6/2006 | Op't Roodt et al. |
| 2007/0061994 A1* | 3/2007 | Lee .................... B60S 1/38 |
| | | 15/250.201 |
| 2008/0016643 A1 | 1/2008 | Braun et al. |
| 2010/0024149 A1* | 2/2010 | Erdal .................... 15/250.32 |
| 2010/0071148 A1 | 3/2010 | Wilms et al. |
| 2010/0180395 A1* | 7/2010 | Aznag .................... 15/250.31 |
| 2010/0319154 A1 | 12/2010 | Bousset |

FOREIGN PATENT DOCUMENTS

| | | | |
|---|---|---|---|
| EP | 2 123 524 A2 | 11/2009 | |
| FR | 2 920 729 A1 | 3/2009 | |
| WO | WO 2010006776 A1 * | 1/2010 | ............... B60S 1/38 |

OTHER PUBLICATIONS

WO2010006776A1 (machine translation), 2010.*
Definition of separate in Oxford Dictionary, 2016.*
International Search Report issued in PCT/EP2012/055328 mailed on Jun. 12, 2012 (6 pages).
Office Action issued in corresponding Chinese Application No. 201280025838.5 dated Nov. 3, 2015, and English translation thereof (21 pages).
Office Action issued in corresponding Mexican Application No. MX/a/2013/011340 dated Sep. 7, 2015, and English translation thereof (6 pages).

* cited by examiner

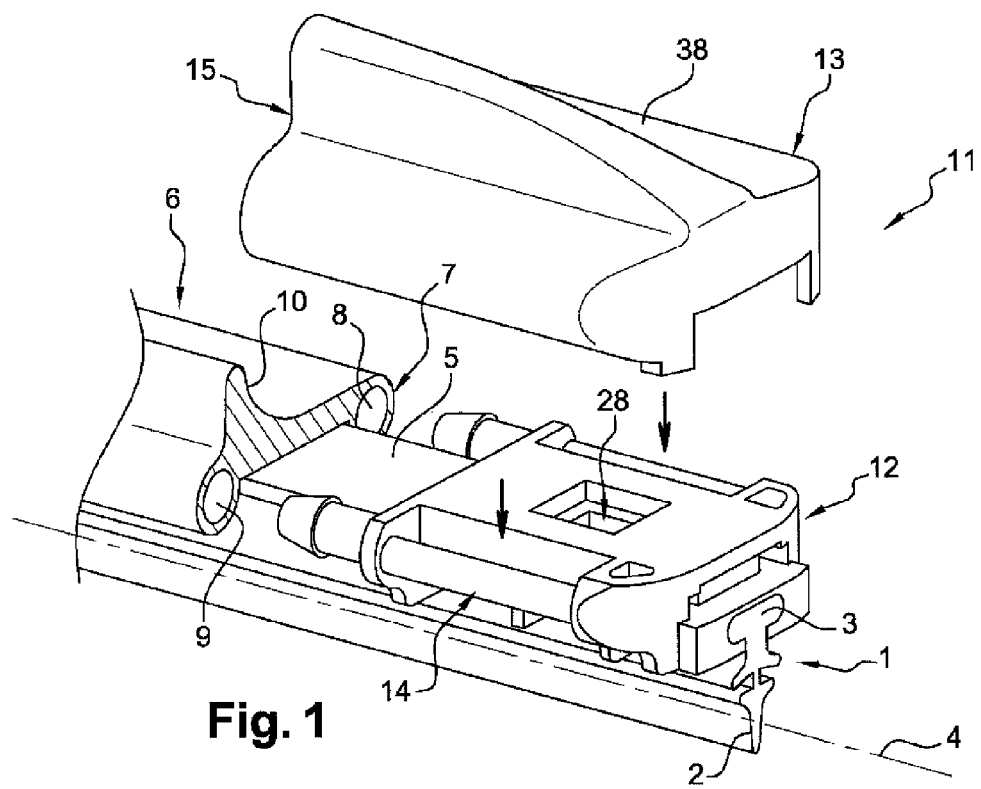
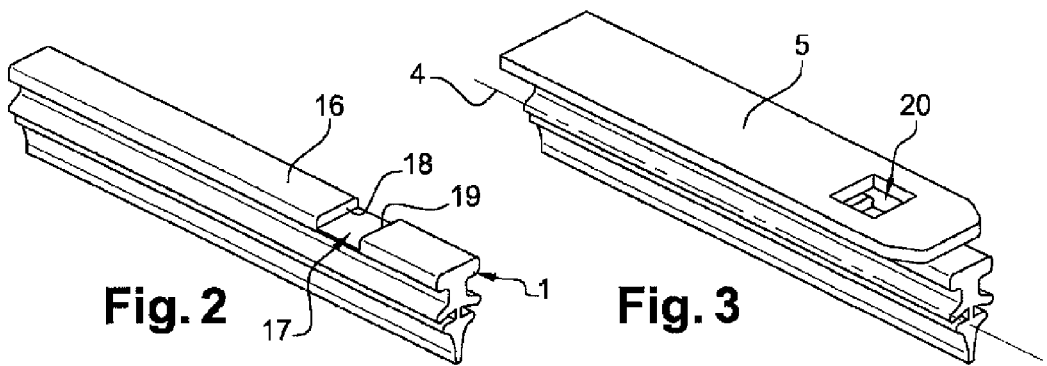
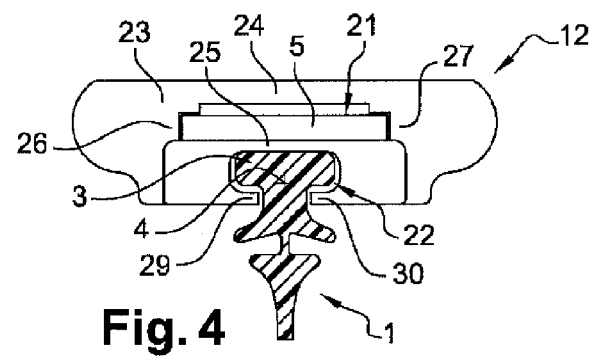

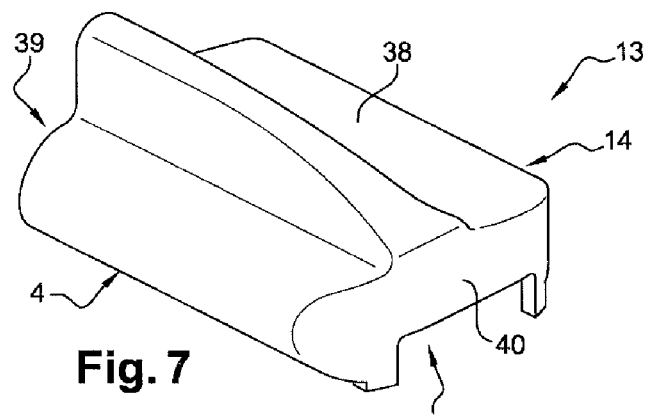
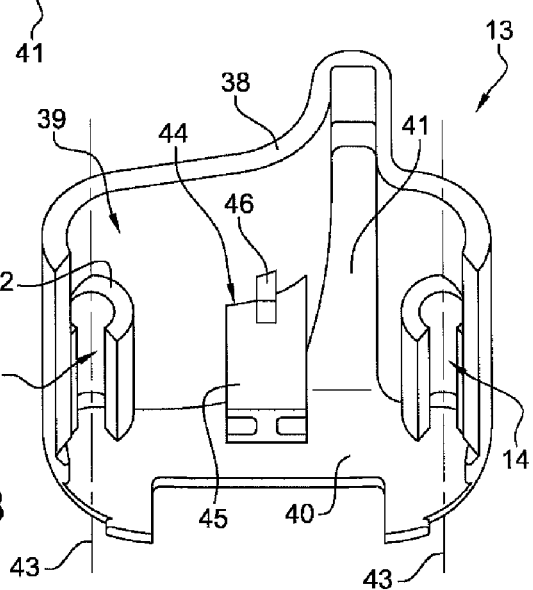
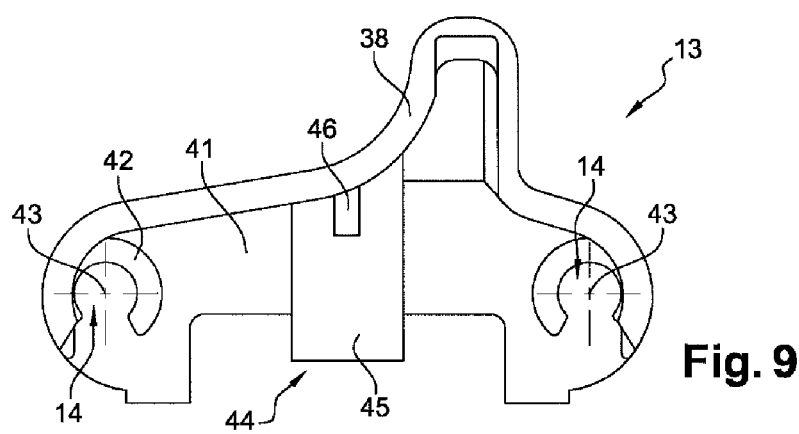

END FITTING FOR A WIPER

The field of the present invention is that of equipment for wiping windows, in particular of a motor vehicle.

Motor vehicles are commonly equipped with windshield wiper systems for cleaning and/or washing the windshield and avoiding disruption to the driver's view of his surroundings. These windshield wipers are conventionally driven by an arm that carries out an angular to-and-fro movement and has elongate wipers which themselves carry squeegee blades made of a resilient material. These blades rub against the windshield and evacuate the water by removing it from the driver's field of view. The wipers are produced in the form either, in a conventional version, of articulated brackets which hold the squeegee blade at a number of discrete locations or, in a more recent version, known as the "flat blade" version, of a semi-rigid assembly which holds the squeegee blade along its entire length. In both solutions, the wiper is attached to the turning arm of the windshield wiper by a connector.

Should the wiping quality deteriorate, it is then necessary to renew the wiping means. There are two solutions: the first consists in replacing the entire wiper with a new wiper while the second solution consists in replacing the squeegee blade while retaining the rest of the wiper.

The invention relates more particularly to this second solution, which involves removing one end of the wiper in order to access the squeegee blade.

In order to fasten the squeegee blade to the constituent support of the wiper, the latter has an end fitting which is mounted at one end of this support and comprises means for securing it with respect to the support.

Furthermore, windshield wipers are also equipped with devices for feeding a windshield washer liquid which is fed from a tank located on the vehicle and which is sprayed in the direction of the windshield by nozzles located either around the windshield or on the windshield wiper itself for improved distribution of the liquid.

The drawback of this second situation, when only the squeegee blade is replaced, is that the device for feeding liquid is open and thus causes a leak. Furthermore, opening the device for feeding liquid during the phase of replacing the blade produces a risk of impurities entering the device. Such a situation is problematic since these impurities block the nozzles, thereby considerably impairing the efficiency of washing the windshield.

Another drawback of such a situation lies in the difficulty of replacing such a squeegee blade. Specifically, it is appropriate to provide a solution which is as ergonomic as possible for replacing the blade. It will thus be appreciated that the presence of a liquid in the handling area complicates the replacement of the blade and the satisfactory refitting thereof. Furthermore, the residual pressure inside the device for feeding liquid can cause liquid to be projected onto the user, it being desirable to avoid this. Furthermore, it is appropriate to make it easier to release and immobilize the squeegee blade with respect to the rest of the wiper.

The object of the present invention is thus to solve the above-described drawbacks mainly by proposing an end fitting consisting of two distinct parts that are connected together in a removable manner, where the blade is removed and refitted in a simple and ergonomic manner without it being necessary to open the line or lines of windshield washer liquid that are present on the wiper.

The subject of the invention is thus an end fitting of a wiper having at least one vertebra and a wiper blade, the end fitting comprising a primary part and a secondary part, the primary part comprising a housing that is able to receive the vertebra and a recess that is able to receive the wiper blade, said primary part also comprising a hole which opens into the housing and into the recess, said secondary part comprising a locking means that is able to immobilize the end fitting with respect to the wiper, said locking means extending into the hole, the primary part and the secondary part being connected by a removable fastening means.

The primary part and the secondary part are two distinct components which are joined together by the fastening means, the latter being removable in that the connection or the separation of the secondary part to or from the primary part can be carried out a number of times without the end fitting being destroyed.

According to a first feature of the invention, the housing and the recess are distinct.

According to a second feature of the invention, the primary part is formed by a body through which the hole passes and at the periphery of which the fastening means is formed. It will be understood here that the removable fastening means is installed laterally with respect to the body.

According to another feature of the invention, the body has an upper face delimiting the housing, an intermediate wall which delimits both the housing and the recess, and wherein the hole is made in the upper face and in the intermediate wall.

According to a further feature of the invention, the secondary part covers the primary part when the wiper is placed in a horizontal plane.

According to yet another feature of the invention, the fastening means is produced by cooperating shapes between the primary part and the secondary part.

In such a situation, the fastening means comprises at least one constituent male cylindrical portion of the primary part and a female cylindrical portion formed on the secondary part.

According to one exemplary embodiment, the male cylindrical portion is formed by a tube having a peripheral wall which extends peripherally through 360°, while the female cylindrical portion is formed by a circular arc which extends peripherally between 181° and 270°. It will be understood that the circular arc is hollow, this hollow portion having dimensions adapted to the dimensions of the tube.

Advantageously, the locking means is arranged with respect to the primary part so as to prevent a movement in translation between the latter and the vertebra.

Advantageously again, the locking means is arranged with respect to the primary part so as to prevent a movement in translation between the latter and the blade.

According to one exemplary embodiment, the locking means is produced in one piece with the secondary part and forms a protuberance which extends into an internal volume of the secondary part, said volume being delimited by a constituent wall of the secondary part. Such a wall originates on the locking means and extends between two circular arcs.

The protuberance has an H- or U-shaped section.

According to a first feature of the invention, a free end of the protuberance comprises at least one tooth that is able to deform the blade. More specifically, the free end of the protuberance comprises a plurality of teeth which are for example aligned with one another.

According to a second feature of the invention, the end fitting according to the invention comprises a blocking means that is able to plug a constituent liquid channeling device of the wiper.

The invention also covers a wiper comprising at least one vertebra, a wiper blade and an end fitting according to any one of the features described hereinabove.

Such a wiper may also comprise at least one liquid channeling device.

A first advantage according to the invention lies in the fact that it is particularly simple to replace the blade since a single operation suffices to free or immobilize the squeegee blade with respect to the rest of the wiper. Such an operation does not require that a button be pressed beforehand, or the extraction of an intermediate part, for example.

Another advantage lies in the fact that the secondary part, which connects the blade to the primary part, can be extracted without the presence of liquid that is liable to complicate this extraction. Furthermore, the blade is replaced in a dry environment, thereby avoiding any projection of liquid onto the user when the blade is fitted and removed.

Since the primary part remains on the wiper, the device for feeding windshield washer liquid is not open, this consequently preventing the introduction of impurities into the lines.

Figure 6:
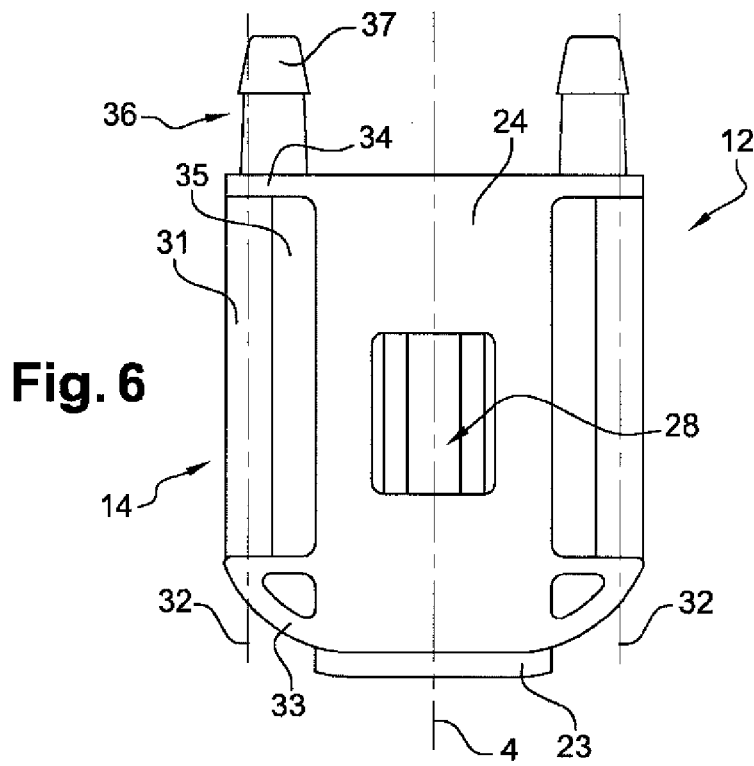
Figure 10:
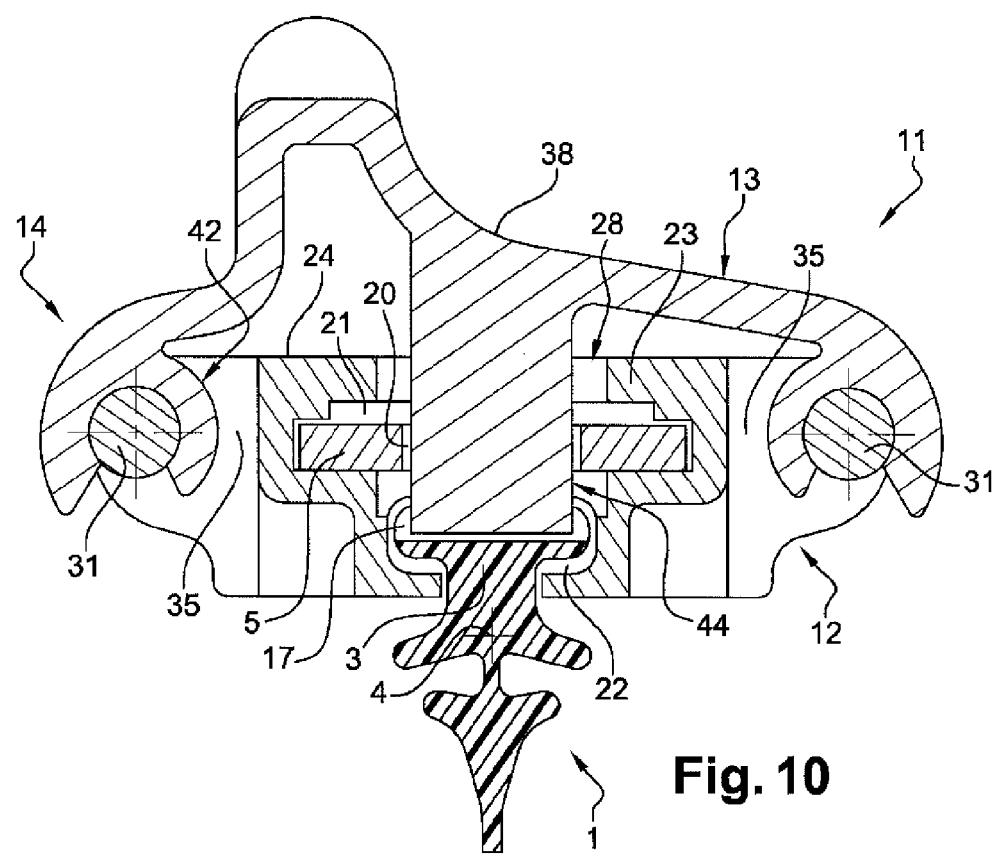
Figure 11:
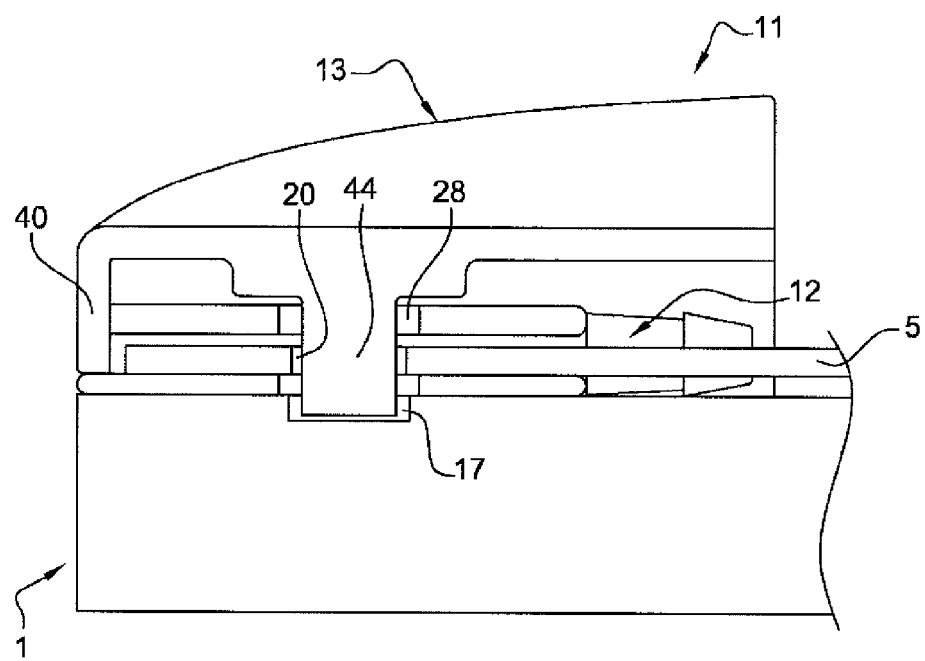
Figure 12:
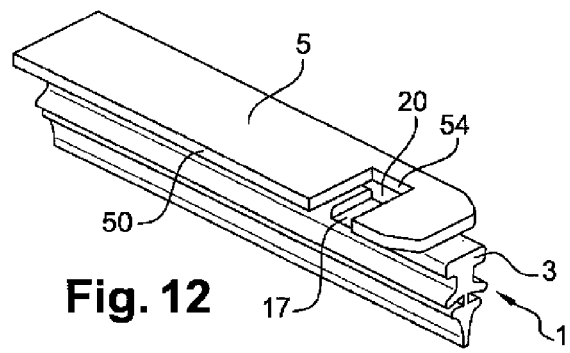
Figure 13:
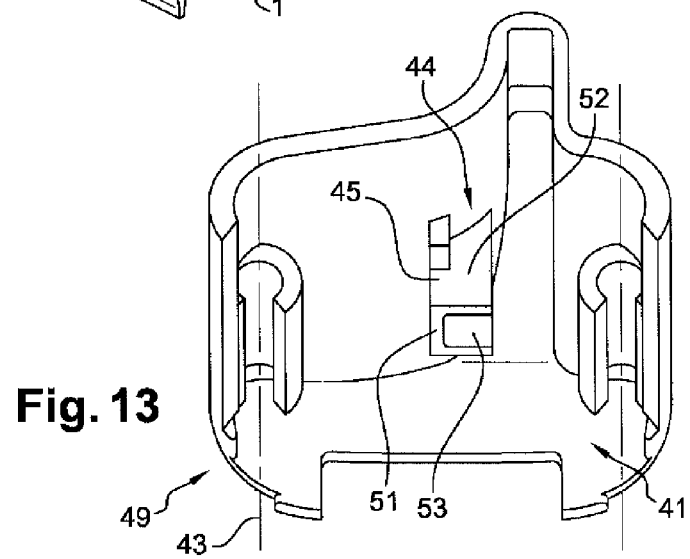
Figure 14:
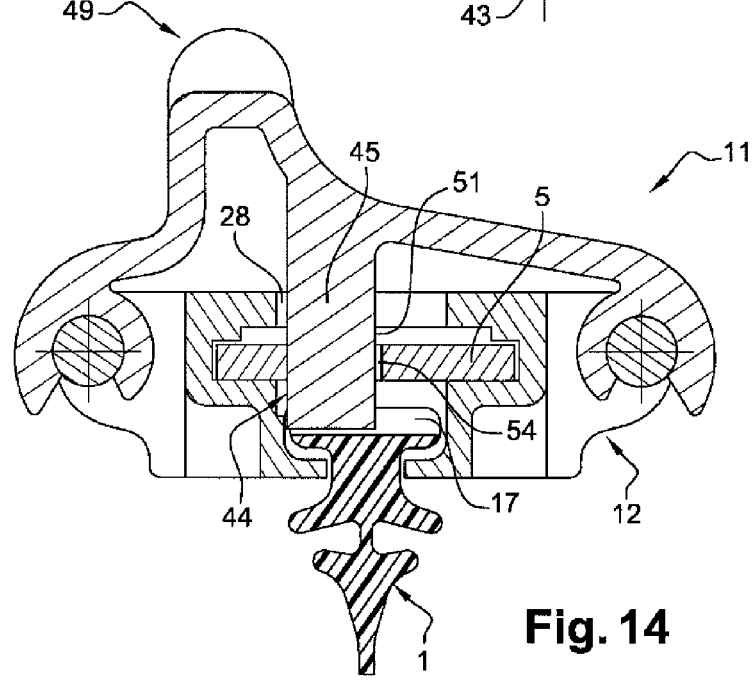
Figure 15:
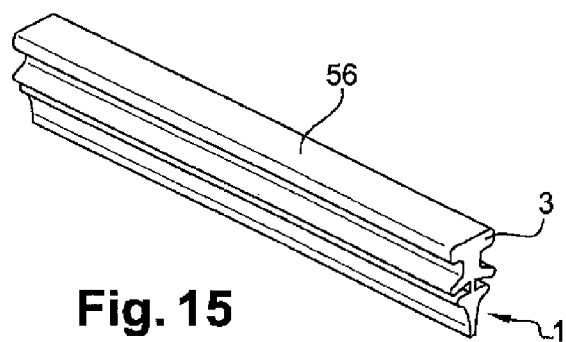
Figure 16:
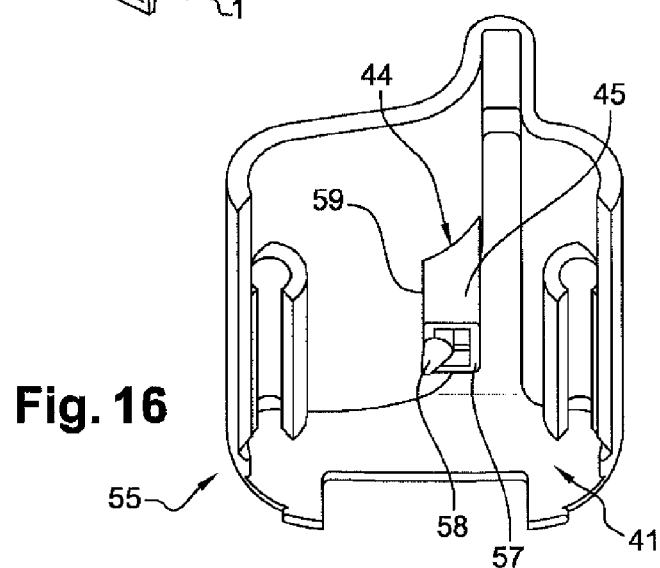
Figure 17:
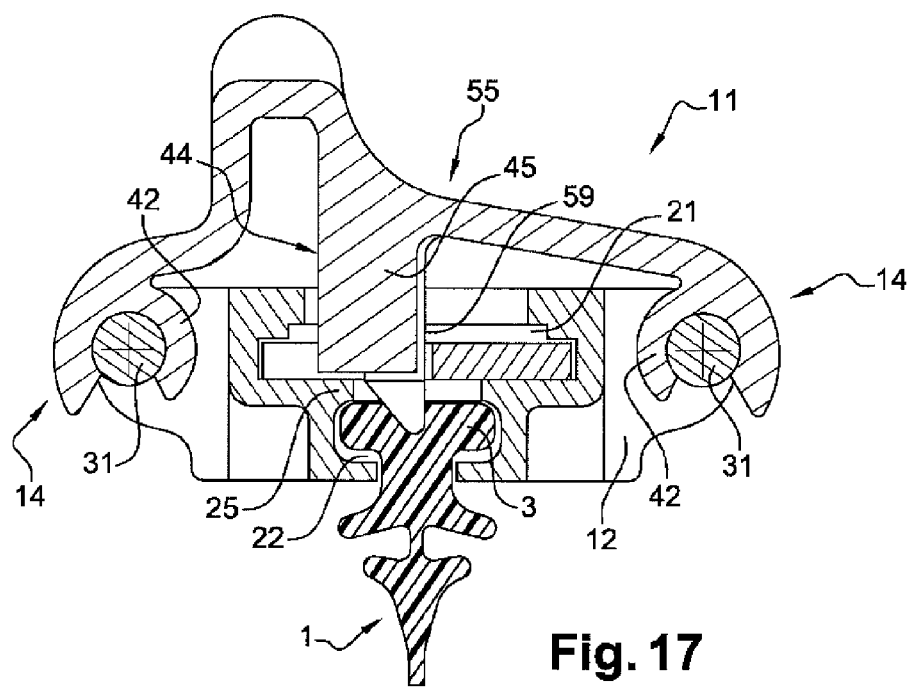
Figure 18:
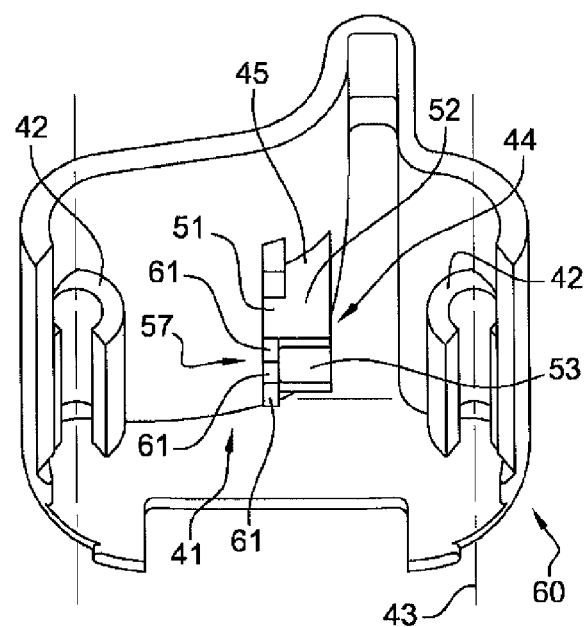
Figure 19:
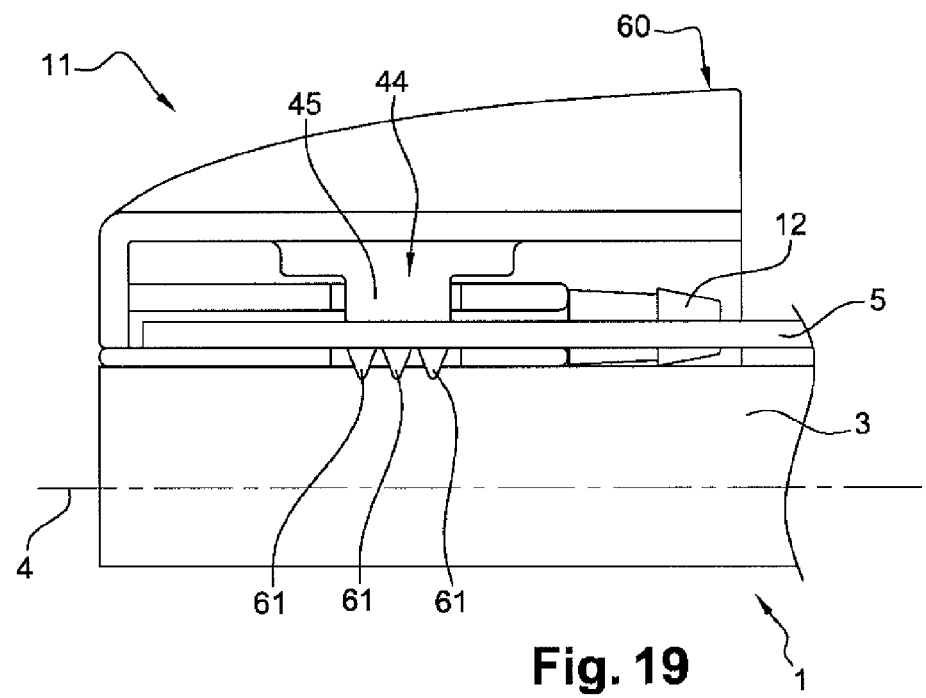

Further features, details and advantages of the invention will become more clearly apparent from reading the description given hereinbelow by way of illustration and with reference to the drawings, in which:

FIG. 1 is a perspective view of a first variant of an end fitting according to the invention installed at the end of a wiper, FIG. 2 is a perspective view of the wiper blade used in the first variant of the invention, FIG. 3 is a perspective view of the wiper vertebra used in the first variant of the invention, FIG. 4 is a side view of the wiper on which the primary part of the end fitting according to the first variant of the invention is mounted, FIG. 5 is a perspective view which shows in detail the primary part according to the first variant of the invention, FIG. 6 is a top view of the primary part illustrated in FIG. 5, FIG. 7 is a perspective top view of the secondary part used in the first variant of the end fitting according to the invention, FIG. 8 is a perspective bottom view of the secondary part used in the first variant of the end fitting according to the invention, FIG. 9 is a side view of the secondary part illustrated in FIGS. 7 and 8, FIG. 10 is a cross-sectional view of the end fitting according to the first variant as installed on a wiper, FIG. 11 is a longitudinal sectional view of the end fitting according to the first variant as installed on a wiper, FIG. 12 is a perspective view of a second embodiment of the wiper vertebra used in a second variant of the invention, FIG. 13 is a perspective bottom view of the secondary part used in the second variant of the end fitting according to the invention, FIG. 14 is a cross-sectional view of the end fitting according to the second variant as installed on a wiper, FIG. 15 is a perspective view of the wiper blade used in a third variant of the end fitting according to the invention, FIG. 16 is a perspective bottom view of the secondary part used in the third variant of the end fitting according to the invention, FIG. 17 is a cross-sectional view of the end fitting according to the third variant as installed on a wiper, FIG. 18 is a perspective bottom view of the secondary part used in a fourth variant of the end fitting according to the invention, FIG. 19 is a longitudinal sectional view of the end fitting according to the fourth variant as installed on a wiper.

It should be noted that the figures disclose the invention in a detailed manner so as to implement the invention, and said figures may of course serve to define the invention more clearly, where necessary.

FIG. 1 shows in a partial manner a wiper with which a wiper system mounted on a motor vehicle is provided. This wiper is installed on the front windshield but it may also be mounted on the rear window of the vehicle.

The wiper comprises a wiper blade 1, also known as a squeegee blade, consisting of an area 2 for rubbing against the window and a heel 3 which ensures the mechanical connection to a constituent support of the wiper. This wiper blade 1 extends lengthwise along a longitudinal axis 4.

The wiper furthermore comprises a vertebra 5 which forms a stiffening device of the wiper. By way of example, this is a single metal strip which extends along the longitudinal axis 4, thus defining its length, and which has at rest a convex curvature with respect to the windshield. This strip has a predetermined flexibility, which, by deforming when the wiper is pressed against the windshield, brings about a force distributed along the length of the wiper blade 1.

The blade 1 and the vertebra 5 are held by the support 6 which thus forms a longitudinal supporting frame covering and retaining the vertebra 5 and the wiper blade 1.

The wiper blade is provided with a liquid channeling device 7 which is secured to the support 6, for example by clip-fastening, adhesive bonding or more generally by cooperating shapes. The liquid channeling device 7 may also be produced in one piece with the support 6, as is the case in FIG. 1. The liquid channeling device 7 is in particular in the form of at least two ducts 8 and 9 which extend longitudinally along the wiper along an axis which is for example parallel to the longitudinal axis 4, and on either side of the wiper blade 1. More specifically, these ducts 8 and 9 are located on the sides of the support 6 and in the continuation of the plane in which the support 6 extends. This liquid channeling device 7 is manufactured from a flexible material, for example a rubber or an elastomer.

The liquid channeling device 7 may be formed jointly with an air deflector 10, the function of which is to increase the bearing force of the wiper on the windshield, to the benefit of the aerodynamic effect of the air. In this exemplary embodiment, the air deflector 10 and the liquid channeling device 7, in particular the two ducts 8 and 9, are molded from one and the same flexible material, such as a rubber or an elastomer. The air deflector 10 and the liquid channeling device 7 thus form a single part.

At the end of the wiper there is installed an end fitting 11. In a general manner, this end fitting 11 carries out a multiplicity of functions:

it blocks the liquid channeling device 7 of the wiper, it allows the wiper blade 1 and the vertebra 5 to be fitted on and removed from the support 6, it secures the wiper blade 1 and the vertebra 5 with respect to the support 6. Securing should be understood here as meaning a means for blocking the translation of the wiper blade 1 with respect to the support 6. Thus, once the end fitting 11 is in place, any movement in translation of the wiper blade 1 is prevented, thereby guaranteeing perfect fastening of the latter with respect to the rest of the wiper.

The end fitting 11 comprises a primary part 12 and a secondary part 13 which are mechanically connected together by a removable fastening, or securing, means 14. The secondary part 13 has a section generally complementary to the section of the support 6, of the channeling device 7 and of the deflector 10. Thus, these three components pass into an internal volume 15 made in the secondary part 13, the latter comprising a peripheral wall 38 which follows the profile of the elements cited hereinabove.

The primary part 12 has a function of retaining the wiper blade 1, a function of retaining the vertebra 5 and a function of blocking the liquid channeling device 7, while the secondary part ensures that these components are locked, that is to say that the wiper blade 1 and the vertebra 5 are positioned correctly with respect to the end fitting 11 along the longitudinal axis 4.

FIG. 2 shows a specific feature of the wiper blade 1 with respect to the first variant embodiment of the end fitting 11. The heel 3 is delimited by an upper wall 16 and it can be seen that this upper wall has a cutout 17 which extends over the entire width of the heel 3 and along a predetermined length. Such a cutout 17 engages with a constituent locking means of the end fitting 1. The cutout 17 forms lateral edges 18 and 19 against which the locking means butts, thereby preventing any movement in translation between the end fitting 11 and the wiper blade 1.

FIG. 3 illustrates the end of the vertebra 5 as used in the context of the first variant embodiment of the end fitting 11. This end of the vertebra comprises an orifice 20 passing through the vertebra 5 from one side to the other. Such an orifice 20 is produced at the center of the vertebra 5 along a transverse axis perpendicular to the longitudinal axis 4.

FIG. 4 shows the primary part 12, the vertebra 5 and the wiper blade 1 in a side view at the end of the wiper. The primary part 12 comprises a housing 21 that is able to receive the vertebra 5 and a recess 22 that is able to receive the wiper blade 1.

The housing 21 is formed in a constituent body 23 of the primary part 12. This housing 21 corresponds to a rectangular removal of material which extends along the longitudinal axis 4. The shape of this housing 21 is complementary to a cross section of the vertebra 5. This housing 21 is thus delimited on one side by an upper constituent face 24 of the body 23, and on the other side by an intermediate wall 25. Laterally, this housing 21 is bordered by two flanks having the references 26 and 27.

The recess 22 receives the heel 3 of the wiper blade 1. This recess 22 extends longitudinally in the body 23, opposite the housing 21 with respect to the intermediate wall 25. It will be understood that the latter delimits both the housing 21 and the recess 22. The body also comprises a cutout which is aligned with the recess 22 and which opens the latter toward the surroundings of the primary part 12. Such a cutout, which has a smaller width than the width of the recess 22, measured along the transverse axis perpendicular to the longitudinal axis 4, enables the passage of a portion of the heel 3. This cutout is bordered by a first edge surface 29 and a second edge surface 30.

FIGS. 5 and 6 show the primary part 12. The latter comprises a hole 28 which opens into the housing 21 and into the recess 22. In practice, the hole 28 passes through the intermediate wall 25 and thus connects the volume delimited by the housing 21 and the volume delimited by the recess 22. Outside this hole 28, which extends in an axis orthogonal to a plane which passes through the upper face 24, the housing 21 is distinct, that is to say separate, from the recess 22.

The area of this hole 28 produced in the upper face 24 and in the intermediate wall 25 is equivalent to the section of the locking means which will be described in FIGS. 8 to 11.

FIGS. 5 and 6 also show the constitution of the removable fastening means 14, which makes it possible to mechanically connect the secondary part 13 to the primary part 12.

In the primary part 12, the removable fastening means 14 comprises a male cylindrical portion 31 which extends, in particular, in a direction which is inscribed in a plane parallel to the plane of the upper face 24. More specifically, this direction of the male cylindrical portion, which has the reference 32, is parallel to the longitudinal axis 4.

According to one exemplary embodiment, the male cylindrical portion 31 has a circular section. In other words, the male cylindrical portion 31 is formed by a solid or hollow tube having a peripheral wall which extends peripherally through 360° around the direction 32 when the latter is placed in the center of the tube.

The male cylindrical portion 31 is located at the periphery of the body 23. This male cylindrical portion 31 is formed laterally with respect to the housing 21, that is to say on the side of the body 23 and in the continuation of the housing 21 in a plane parallel to the plane of the upper face 24.

The male cylindrical portion 31 is connected to the body 23 by two arms, respectively having the references 33 and 34, that are formed at each end of the body 23, along the longitudinal axis 4. Such a disposition makes it possible to form an aperture 35 between the body 23 and the male cylindrical portion 31, such an aperture 35 making it possible to receive the fastening means produced on the secondary part, as will be detailed hereinbelow.

An exemplary embodiment of a blocking means 36 is shown in these figures. This blocking means 36 has the function of plugging or closing the fluid channeling device 7 of the wiper. To do this, the primary part 12 comprises at least one stud 37 arranged so as to face the duct 8 or 9. This stud is a tubular protuberance which extends along an axis parallel to the longitudinal axis 4 and coincident with an axis along which the duct in question extends. The outside diameter of this stud 37 is slightly greater than the inside diameter of the respective duct. Since the constituent material of the ducts is flexible, the latter deform in order to fit over the stud 37 and thus to be liquid-tight. It will finally be noted that the free end of the stud 37 has a bevel which makes it easier to introduce the stud into the duct.

The blocking means 36 may have other embodiments as long as it seals the liquid channeling device 7 at the ends of the wiper. By way of example, the blocking device may be formed by planar abutment of the end of the ducts 8 or 9 directly against a flank of the body 23.

The above description of the primary part mentions features on a first side of the primary part, but it goes without saying that a second side, opposite the first side with respect to the body 23, has identical features. In other words, the primary part 12 is divided in two by a plane of symmetry which passes through the longitudinal axis 4, thereby making it possible to produce a blocking means 36 which comprises two studs 37 and a removable fastening means 14 which comprises two cylindrical portions 31, each separated from the body 23 by an aperture 35.

FIGS. 7 to 9 show the secondary part 13 that is used in the first variant of the end fitting 11. Such a secondary part 13 forms a cover which, when the wiper is placed in a horizontal plane, covers the primary part. In other words, this secondary part 13 is placed above and in the continuation of the primary part and has the peripheral wall 38 having a shape corresponding to or complementary with the shape of the support 6, including the deflector 10. This peripheral wall originates on each removable connecting means 14 formed on the secondary part 13. The peripheral wall 38 comprises an open end 39 into which the wiper support extends when the end fitting is assembled thereon, and has an end wall 40 opposite the open end 39. Such an organization delimits an internal volume 41. It will be noted that the end wall 40 has a cutout which engages with the end of the primary part.

The removable fastening means 14 is produced by cooperating shapes formed both on the primary part and on the secondary part.

As far as the secondary part 13 is concerned, this removable fastening means 14 comprises a female cylindrical portion 42 which is for example in the form of a circular arc. This female cylindrical portion 42 is open along its length and hollowed out in its center so as to allow the male cylindrical portion 31 of the primary part 12 to be positioned inside the female cylindrical portion 42 of the secondary part 13. This female cylindrical portion 42 is formed by a hollow tube having a central axis, having the reference 43, parallel to the direction 32. The inside diameter of the cylindrical portion 42 is identical, to within manufacturing tolerances, to the outside diameter of the male cylindrical portion 31 formed on the primary part.

The female cylindrical portion 42 is open in that it has a cutout, or trench, which extends parallel to the central axis 43. In other words, the female cylindrical portion 42 is formed by a circular arc which extends peripherally between 181° and 270°. Such a disposition gives the female cylindrical portion 42 flexibility so as to allow the introduction of the male cylindrical portion 31 of the primary part 12, while ensuring retention of the male cylindrical portion 31 by the female cylindrical portion 42. Reliable but releasable fastening is thus produced between the primary part and the secondary part 13.

The locking means 44 can also be seen in FIGS. 8 and 9. This locking means 44 has the function of immobilizing the end fitting with respect to the wiper, in particular so as to prevent any movements along the longitudinal axis 4, known hereinbelow as movements in translation.

More specifically, the locking means 44 is formed on the secondary part 13 so as to prevent movements in translation between the primary part and the vertebra of the wiper. The squeegee blade is also immobilized by the locking means 44.

The locking means 44 is produced in one piece with the secondary part 13. In other words, the secondary part 13 and the locking means 44 are produced in one and the same mold and manufactured from one plastics material.

By way of example, the locking means is in the form of a protuberance 45 which extends into the internal volume 41 of the secondary part 13, in particular in a direction perpendicular to the plane of the upper face of the primary part.

Such a protuberance 45 has an H-shaped section when it is cut in the plane of the upper face. Reinforcing ribs 46 are formed at the base of the protuberance, that is to say the point at which it originates from the peripheral wall 38.

FIGS. 10 and 11 show the end fitting 11 and the wiper that receives it.

In FIG. 10, the cross section is made in a plane orthogonal to the longitudinal axis 4, while in FIG. 11, the cross section is made in a plane parallel to this longitudinal axis 4, these two cross sections passing through the locking means 44.

The engagement between the male cylindrical portion 31 of the primary part 12 with the female cylindrical portion 42 protruding from the secondary part 13 is particularly visible. It will thus be understood that the male cylindrical portion 31 and the female cylindrical portion 42 have shapes formed in the primary part and the secondary part, these shapes producing the removable fastening means 14 by cooperation. The aperture 35 made between the body 23 and the male cylindrical portion 31 allows the circular arc of the female cylindrical portion 42 to extend around the male cylindrical portion 31 and thus to produce the removable fastening between the primary part 12 and the secondary part 13.

The slot in the female cylindrical portion 42 is produced in the lower quarter of this cylindrical portion, that is to say the quarter opposite the peripheral wall 38 of the secondary part 13.

The hole 28 formed in the primary part is also apparent and it can be clearly seen that this hole starts in the region of the upper face 24, continues through the housing 21 which receives the vertebra 5, passes through the intermediate wall 25 and ends in the recess 22, in which the wiper blade 1 is housed.

The locking means 44 is installed in the hole 28 and comes into contact with the orifice 20 produced in the vertebra 5 and the cutout 17 produced in the wiper blade 1, the free end of the locking means 44 coming into contact with the heel 3 at the bottom of the cutout 17.

FIGS. 12 to 14 show a second variant of the end fitting 11 which uses the primary part 12 of the first variant and an adapted secondary part 49. Reference should be made to the above description in order to be acquainted with the production of the primary part 12.

In this second variant of the end fitting 11, it can be seen in FIG. 12 that the orifice 20 formed at the end of the vertebra 5 is open on a longitudinal side 50 of this vertebra 5. The position of this orifice 20 is also modified since its depth, that is to say the edge 54 extends approximately in a longitudinal axis of symmetry which divides the vertebra 5 into two equivalent parts. Such an arrangement is easier to produce than the orifice 20 having a square perimeter of the first variant embodiment. The wiper blade 1 also comprises a cutout 17 produced in its heel 3.

FIG. 13 shows the internal volume 41. This secondary part 49 differs from the secondary part 13 of the first variant by way of the section of the locking means 44. Specifically, the protuberance 45 has a U-shaped section. A base 51 of the U extends in a plane parallel to the central axis 43 and two arms 52 and 53 extend perpendicularly to the base 51.

In FIG. 14, the engagement between the locking means 44, the vertebra 5 and the wiper blade 1 can be seen. The base 51 comes into contact with the edge 54, the protuberance 45 extending into the hole 28 as far as into the cutout 17 in the blade 1.

FIGS. 15 to 17 show a third variant of the end fitting 11 which uses the primary part 12 of the first variant and a modified secondary part 55. Reference should be made to the above description in order to be acquainted with the production of the primary part 12.

In this third variant of the end fitting 11, the vertebra 5 of the second variant is used. By contrast, it will be seen in FIG. 15 that the heel 3 of the wiper blade 1 does not have a cutout. In other words, an upper wall 56 of the heel 3 is uniform, for example smooth.

FIG. 16 shows the internal volume 41 of the secondary part 55. This secondary part 55 differs from the secondary part 49 of the second variant by way of the section of the locking means 44, its length and the shape of its free end. Specifically, the protuberance 45 forming the locking means 44 has a rectangular section with an internal reinforcement. Furthermore, the locking means 44 of this third variant is arranged such that its free end 57 is in the housing 21 or in the thickness of the intermediate wall 25. Thus, the protuberance 45 does not pass into the recess 22.

The protuberance 45 also comprises a free end 57 from which at least one tooth 58 originates.

In this exemplary embodiment, the tooth 58 has a conical profile with an axis coincident with a constituent flank 59 of the protuberance 45. It will be understood here that the axis is offset. Alternatively, the tooth may have a conical shape with a central axis.

According to this third variant embodiment, the wiper blade 1 is immobilized when the tooth 58 passes into the heel 3 of the wiper blade 1. The plastics material of this tooth is harder than the constituent material of the wiper blade 1 and the latter thus deforms under the pressure of the tooth 58.

Such a pressure occurs when the removable fastening means 14 is employed. Specifically, the force necessary for the tooth 58 to enter the heel 3 results from the engagement between the male cylindrical portion 31 of the primary part 12 with the female cylindrical portion 42 of the secondary part 55.

As for the first and the second variant, the protuberance 45 prevents any movements in translation between the primary part 12, the vertebra 5 and the wiper blade 1.

FIGS. 18 and 19 show a fourth variant of the end fitting 11. As for the preceding variants, the primary part 12 of the first variant is used identically while a secondary part 60 is modified. Reference should be made to the above description in order to be acquainted with the production of the primary part 12.

In this fourth variant of the end fitting 11, the vertebra 5 of the second variant and the wiper blade 1 of the third variant of the invention are used. In other words, the vertebra 5 has an orifice that is open at the side while the wiper blade 1 has a heel 3 with a uniform upper wall.

FIG. 18 shows the internal volume 41. This secondary part 49 differs from the secondary part 13 of the first variant by way of the section of the locking means 44. Specifically, the protuberance 45 has a U-shaped section. A base 51 of the U extends in a plane parallel to the central axis 43 and two arms 52 and 53 extend perpendicularly to the base 51. In other words, the protuberance 45 of the fourth variant has a structure similar to the one described with respect to the second variant embodiment of the end fitting 11, apart from its length. Specifically, the free end 57 extends into the housing 21 or into the thickness of the intermediate wall 25.

By contrast, the free end 57 of the protuberance 45 has a multiplicity of teeth 61, each of which having the shape of an isosceles triangle. This multiplicity of teeth 61 is produced in the continuation of the base 51 such that they are aligned in a manner parallel with the longitudinal axis 4 of the wiper blade 1.

In a manner similar to the third variant embodiment of the end fitting 11, the wiper blade 1 is immobilized when the teeth 61 pass into the heel 3 of the wiper blade 1. The plastics material of these teeth is harder than the constituent material of the wiper blade 1 and the latter thus deforms under the pressure of the teeth 61.

Such a pressure occurs when the removable fastening means is employed. Specifically, the force necessary for the teeth 61 to enter the heel 3 results from the engagement between the male cylindrical portion of the primary part 12 with the female cylindrical portion 42 of the secondary part 60.

A wiper blade 1 of a wiper comprising at least one end fitting according to any one of the variants described hereinabove is replaced in the following way:

extraction of the secondary part from the primary part by the secondary part being pulled in a direction perpendicular to the plane which passes through the upper face of the primary part, removal, by a movement in translation, of the wiper blade to be replaced, the primary part remaining secured to the wiper, insertion of a new wiper blade by a movement in translation, threading it into the recess in the primary part, alignment of the wiper blade with one end of the primary part, mounting of the secondary part on the primary part by means of clip-fastening implemented by the removable fastening means.

The invention claimed is:

1. An end fitting of a wiper, said wiper having at least one vertebra and a wiper blade, the end fitting comprising:
   a primary part and a secondary part, the primary part comprising:
      a housing that is able to receive the vertebra,
      a recess that is able to receive the wiper blade, and
      a hole which opens into the housing and into the recess,
   said secondary part comprising a locking means that is able to immobilize the end fitting with respect to the wiper,
   the primary part and the secondary part being connected by a removable fastening means,
   wherein the vertebra comprises an orifice that passes through the vertebra from one side to another side,
   wherein the vertebra is a separate and independent constructional element from the wiper blade,
   wherein the wiper blade is elongated in a longitudinal direction and the end fitting covers a terminal longitudinal end of the wiper blade,
   wherein the wiper blade includes a cutout,
   wherein the locking means extend into the hole, the orifice, and the cutout, and
   wherein the housing and the recess are separate.

2. The end fitting as claimed in claim 1, wherein the primary part is formed by a body through which the hole passes and at a periphery of which the removable fastening means is formed.

3. The end fitting as claimed in claim 2, wherein the body has an upper face delimiting the housing, an intermediate wall which delimits both the housing and the recess, wherein the hole is made in the upper face and in the intermediate wall.

4. The end fitting as claimed in claim 1, wherein the secondary part covers the primary part when the wiper is placed in a horizontal plane.

5. The end fitting as claimed in claim 1, wherein the removable fastening means is produced by cooperating shapes between the primary part and the secondary part.

6. The end fitting as claimed in claim 1, wherein the removable fastening means comprises at least one constituent male cylindrical portion of the primary part and a female cylindrical portion formed on the secondary part.

7. The end fitting as claimed in claim 6, wherein the at least one constituent male cylindrical portion is formed by a tube having a peripheral wall which extends peripherally through 360°, while the female cylindrical portion is formed by a circular arc which extends peripherally between 181° and 270°.

8. The end fitting as claimed in claim 1, wherein the locking means is arranged with respect to the primary part so as to prevent a movement in translation between the primary part and the vertebra.

9. The end fitting as claimed in claim 1, wherein the locking means is arranged with respect to the primary part so as to prevent a movement in translation between the primary part and the wiper blade.

10. The end fitting as claimed in claim 1, wherein the locking means is produced in one piece with the secondary part and forms a protuberance which extends into an internal volume of the secondary part, said internal volume being delimited by a constituent peripheral wall of the secondary part.

11. The end fitting as claimed in claim 10, wherein a free end of the protuberance comprises at least one tooth that is able to deform the wiper blade.

12. The end fitting as claimed in claim 1, further comprising a blocking means that is able to plug a constituent liquid channeling device of the wiper.

13. A wiper comprising:
   at least one vertebra,
   a wiper blade; and
   an end fitting comprising:
      a primary part and a secondary part, the primary part comprising:
         a housing that is able to receive the vertebra,
         a recess, separate from the housing, that is able to receive the wiper blade, and
         a hole which opens into the housing and into the recess,
      said secondary part comprising a locking means that is able to immobilize the end fitting with respect to the wiper,
      the primary part and the secondary part being connected by a removable fastening means,
   wherein the vertebra is a separate and independent constructional element from the wiper blade that comprises an orifice that passes through the vertebra from one side to another side,
   wherein the wiper blade comprises a cutout and is elongated in a longitudinal direction, wherein the end fitting covers a terminal longitudinal end of the wiper blade, and
   wherein the locking means extend into the hole, the orifice, and the cutout.

14. The wiper as claimed in claim 13, further comprising at least one liquid channeling device for feeding a windshield washer liquid.

15. The wiper as claimed in claim 14, the primary part comprising blocking means for closing the at least one liquid channeling device.

16. The end fitting as claimed in claim 1, the primary part comprising blocking means for closing at least one liquid channeling device of the wiper.

17. The end fitting as claimed in claim 1, wherein the orifice of the vertebra is produced at a center of the vertebra along a transverse axis perpendicular to a longitudinal axis.

18. The end fitting as claimed in claim 1, wherein the orifice of the vertebra is open on a longitudinal side of the vertebra.

* * * * *